(12) United States Patent
Skrbina et al.

(10) Patent No.: US 6,862,537 B2
(45) Date of Patent: Mar. 1, 2005

(54) SENSOR FUSION SYSTEM ARCHITECTURE

(75) Inventors: David Skrbina, Northville, MI (US); Stanley Thomas Kronen, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 1 day.

(21) Appl. No.: 10/065,958

(22) Filed: Dec. 4, 2002

(65) Prior Publication Data

US 2003/0179084 A1 Sep. 25, 2003

Related U.S. Application Data

(60) Provisional application No. 60/366,439, filed on Mar. 21, 2002.

(51) Int. Cl.$^7$ .............................................. G01C 23/00
(52) U.S. Cl. ........................................ 702/32; 701/301
(58) Field of Search ............................... 702/32, 38, 57, 702/66, 94, 95, 96, 97, 104, 142, 143, 150, 151–153, 189; 701/1, 2, 23, 116, 223, 301

(56) References Cited

U.S. PATENT DOCUMENTS

| | | | |
|---|---|---|---|
| 5,475,494 A | 12/1995 | Nishida et al. | |
| 5,479,173 A | 12/1995 | Yoshioka et al. | |
| 5,646,612 A | 7/1997 | Byon | |
| 5,983,161 A | 11/1999 | Lemelson et al. | |
| 6,037,860 A | 3/2000 | Zander et al. | |
| 6,278,918 B1 * | 8/2001 | Dickson et al. | 701/23 |
| 6,405,132 B1 * | 6/2002 | Breed et al. | 701/301 |
| 6,492,935 B1 * | 12/2002 | Higuchi | 342/70 |
| 6,499,025 B1 * | 12/2002 | Horvitz et al. | 706/52 |
| 6,580,973 B2 * | 6/2003 | Leivian et al. | 701/1 |

FOREIGN PATENT DOCUMENTS

JP          6-7621          1/1994

* cited by examiner

*Primary Examiner*—Marc S. Hoff
*Assistant Examiner*—Edward Raymond
(74) *Attorney, Agent, or Firm*—Dykema Gossett PLLC; Frank MacKenzie

(57) ABSTRACT

A sensor system for generating information useful for determining the environment surrounding a vehicle includes multiple sensing zones, with each zone using sensors operating in different electromagnetic bands. The outputs of the sensors are fused to provide more useful information than that obtainable from either sensor, taken alone.

4 Claims, 5 Drawing Sheets

SENSOR FUSION SYSTEM ARCHITECTURE

This Application claims the benefit of U.S. Provisional Application No. 60/366,439, filed on Mar. 21, 2002.

BACKGROUND OF INVENTION

1. Field of the Invention

The present invention relates to a collision avoidance system of a vehicle, and more particularly to a collision avoidance system of a vehicle that is capable of distinguishing the type of objects around a vehicle and the position and velocity of the objects relative to the vehicle.

2. Description of the Prior Art

There is a continuing increase in the density of vehicles on the road and a simultaneous emphasis on improving the safety of highway and ordinary roadway vehicles operation by preventing vehicles from colliding with stationary and moving objects. One means for accomplishing this is to detect or monitor the relative speed, the direction of travel, and the distance between vehicles sharing the roadway, and to use such information to provide direct indications to the vehicle's driver of potential danger.

For example, U.S. Pat. No. 6,037,860 issued Mar. 14, 2000 to Zander et al. and assigned to Volkswagen AG, teaches using a seat occupancy sensor to evaluate various collision strategies as an indicating function of possible severity of damage or injury. For this purpose, a collision strategy in which there are no injuries to persons is preferably selected, i.e. a collision with an inanimate object is carried out if this does not involve the driver and further vehicle occupants being subjected to excessive danger. For this purpose, the motor vehicle is actuated in such a way that most of the unoccupied areas of the vehicle absorb the impact energy, i.e. the vehicle is turned with the unoccupied areas towards the object with which it is colliding.

The Zander et al. system provides for a representation of the vehicle surroundings as determined by a number of laser sensors, radar sensors and thermal imaging and other cameras or a combination thereof. Thus, the Zander et al. system detects moving objects in the environment and internal vehicle conditions, in order to generate vehicle controls to avoid or minimize vehicle collisions. Sensor information is processed In an evaluation unit to determine a course of action and vehicle actuators implement the selected course of action. It would be desirable to have a more complete list of information regarding type of objects, distance from the host (including radial and angular information), and relative velocity. In particular, it would be desirable to have object-tracking data for visual awareness purposes, threat analysis, and possible subsequent vehicle actions. These are some of the problems the present invention overcomes.

Further, the Zander et al. patent generally alludes to combining of various sensor technologies to form a picture of the targets surrounding the vehicle. However, for any particular target at any particular time, there is no teaching of using more than one sensor to obtain target-tracking information. It would be desirable to teach combining sensor information in an explicit way such that each field around the host car is covered in duplicate by radar and a camera. Using a fusion combination, in accordance with an embodiment of this invention, the best and most useful data from the radar is combined with the best and most useful data from the camera.

U.S. Pat. No. 5,479,173 issued Dec. 26, 1995 to Yoshioka et al. and assigned to Mazda Motor Corporation teaches combining radar and camera data to determine a danger level of an object in the predicted path of the host car. It would still be desirable to build a complete picture of objects around the host car.

U.S. Pat. No. 5,475,494 issued Dec. 12, 1995 to Nishida et al. and assigned to Mitsubishi Denki Kabushiki Kaisha teaches gauging size and distance of objects based on a calculated two-dimensional image. The system looks forward only and does not use true radar sensing. Data from a single forward looking camera are combined with data from a set of laser radar sensors.

SUMMARY OF INVENTION

This invention uses complementary sensors to provide information characterizing the environment around a vehicle. This information can be further processed and used in a variety of ways. For example, there may be implemented new advanced electronic features that use remote sensing in an integrated and cost-effective manner. Such features may include lane changing aids, night vision assistance, lane departure conditions, and other such features.

Present solutions to providing information characterizing the environment around a vehicle often rely on single sensing technologies such as visual cameras, for lane departure, infrared (IR) cameras for night vision, and radar for adaptive cruise control. Such single sensing technologies are limited in robustness due to environmental and technological limitations. Such systems typically fail to take into account information gained by other sensors.

In accordance with an embodiment of this invention, an electrical architecture integrates, or fuses, multiple sensors, and multiple sensing technologies, to create a data bank of information on objects surrounding the vehicle. Fused data can identify positions and velocities of objects, and can classify them in rough categories according to object size, such as heavy truck, passenger car, motorcycle, pedestrian, and so on. These data can then be communicated to all relevant control modules in the vehicle, to allow for more intelligent implementation of advanced features. It is particularly advantageous to combine sensors from two different bands of the electromagnetic spectrum. For example, visual cameras and radar sensors can be combined to achieve the above objective. Cameras and radars are located around the vehicle and sense overlapping areas. This allows distance data from radar to be combined with visual data from cameras.

Thus, this invention teaches detecting the environment and providing a reliable set of data about objects in the environment. Radar and camera sensors can provide the inputs to a central fusion module. The central fusion module processes the inputs to generate object-tracking data. This includes a list of information regarding type of object, distance from host car, including radial and angular information, and velocity. The object tracking data are available as output from the central fusion modules for visual awareness purposes, threat analysis, and possible vehicle actions.

In accordance with this invention, the sensors are arrayed such that each field around the host car is covered in duplicate by radar and a camera. The combining of the data is then done by fusion. That is, the best and most useful data from the radar is combined with the best and most useful data from the camera. Using both sensing technologies provides an improvement over using a single sensing technology alone to determine necessary information about surrounding objects, whether moving or stationary. This type of data fusion requires a system that provides a time tag with the data so that the data can be combined effectively. If desired, the data can be interpolated and extrapolated to the point in time for the fusion to provide increased accuracy. These fused data are stored in a target track file. Subsequent additional fused data are compared to the current track files and if a match is found the track file is updated. The current track files are output for further processing.

DETAILED DESCRIPTION

Figure 1:
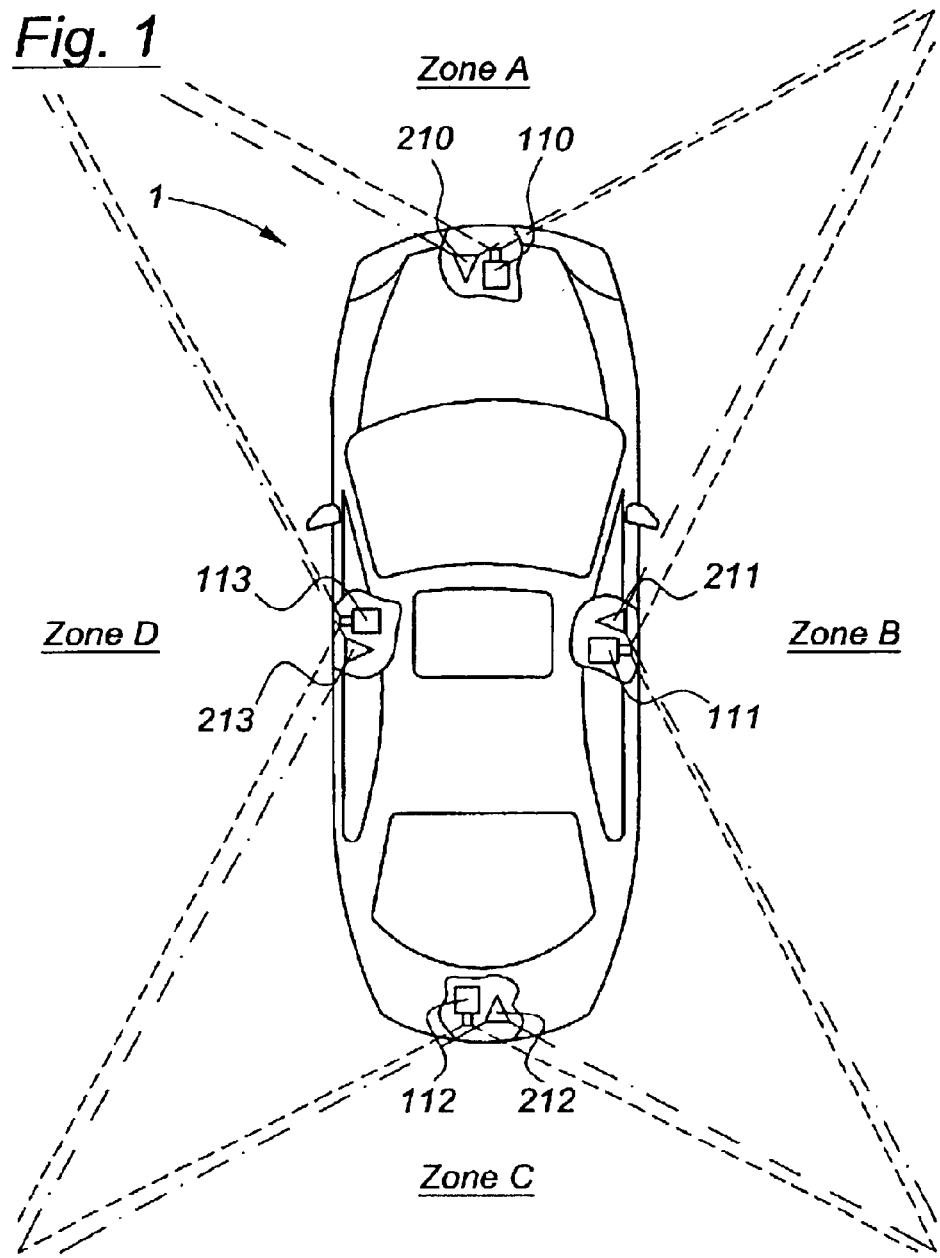
FIG. 1 is a plan view of a vehicle with information gathering zones A, B, C, and D, each zone including two sensors.

FIG. 1 is a plan view of a vehicle 1 with illustrated sensing zones A, B, C, and D. In each of zones A, B, C, and D two sensors are deployed. The sensors are each from different bands of the electromagnetic radiation spectrum and provide complementary information. Advantageously, one is selected to be an active radar sensor and the other a visual sensor, such as a camera. Thus, there are two overlapping sensors in each of the zones A, B, C, and D. Because the sensors overlap complementary information is available about any target in the zone. The two sensors can provide more information about the target than either sensor could individually. More specifically, zone A includes a camera sensor 110 and a radar sensor 210, zone B includes a camera sensor 111 and a radar sensor 211, zone C includes a camera sensor 112 and a radar sensor 212, and zone D includes a camera sensor 113 and a radar sensor 213.

Information from these camera sensors 110, 111, 112 113 and radar sensors 210, 211, 212, 213 Is processed as complementary pairs to determine information about the environment surrounding the vehicle. Information from the sensors, camera sensors 110, 111, 112 113 and radar sensors 210, 211, 212, 213, is time tagged to indicate the time that the information was gathered. In accordance with an embodiment of this invention, information from paired camera sensor 110 and radar sensor 210 in zone A with the closest time tags is compared and fused to provide fused information data. This information is then used to generate characterizing descriptions of any target in the particular zone generating the sensor signals. Similarly, information from sensor pairs in zone B (camera sensor 111 and radar sensor 211), zone C (camera sensor 112 and radar sensor 212), and zone D (camera sensor 113 and radar sensor 213) is time tagged and fused to provide fused information data. For example, radar sensor 210 and camera sensor 110 in zone A can provide information about a motorcycle in zone A. Such information can include size, speed, direction, acceleration, and so on.

Radar sensors are particularly advantageous to help determine distance and whether a target is moving or standing still. Relative velocity can be determined based on the frequency shift of the received radar signal versus the transmitted radar signal. Cameras can provide good information with respect to angular information and object recognition. Thus the complementary combination of a camera and radar sensor provides more information than either sensor could individually.

Figure 2:
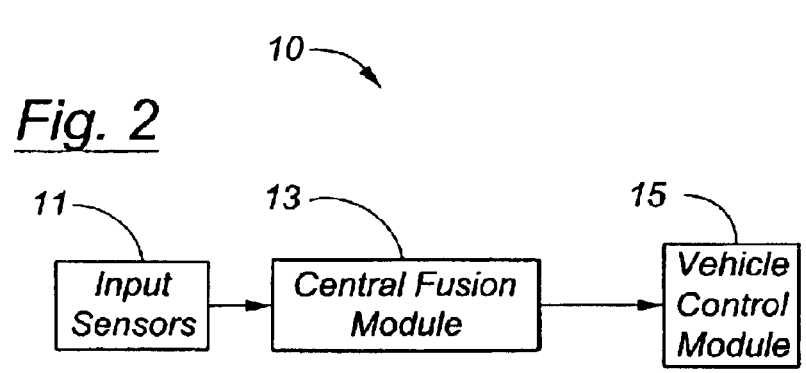
FIG. 2 is a block diagram showing a collision avoidance system of a vehicle according to one embodiment of the present invention.

FIG. 2 is a block diagram showing a vehicle collision avoidance system 10 of a vehicle, according to a preferred embodiment of the present invention. Collision avoidance system 10 includes an input detecting section 11 having an output coupled to a central fusion-processing module 13. The output of central fusion module 13 is applied to a vehicle control module 15. Central fusion module 13 supplies an activating output to vehicle control module 15, which may include a plurality of vehicle control modules. In situations where a crash may be imminent, an active safety system may be energized and other pre-crash action may be taken. Thus an active and a passive safety module may be activated. In turn, these modules may control a braking module, a light control module, an adaptive steering module, a security module, and other modules.

Figure 3:
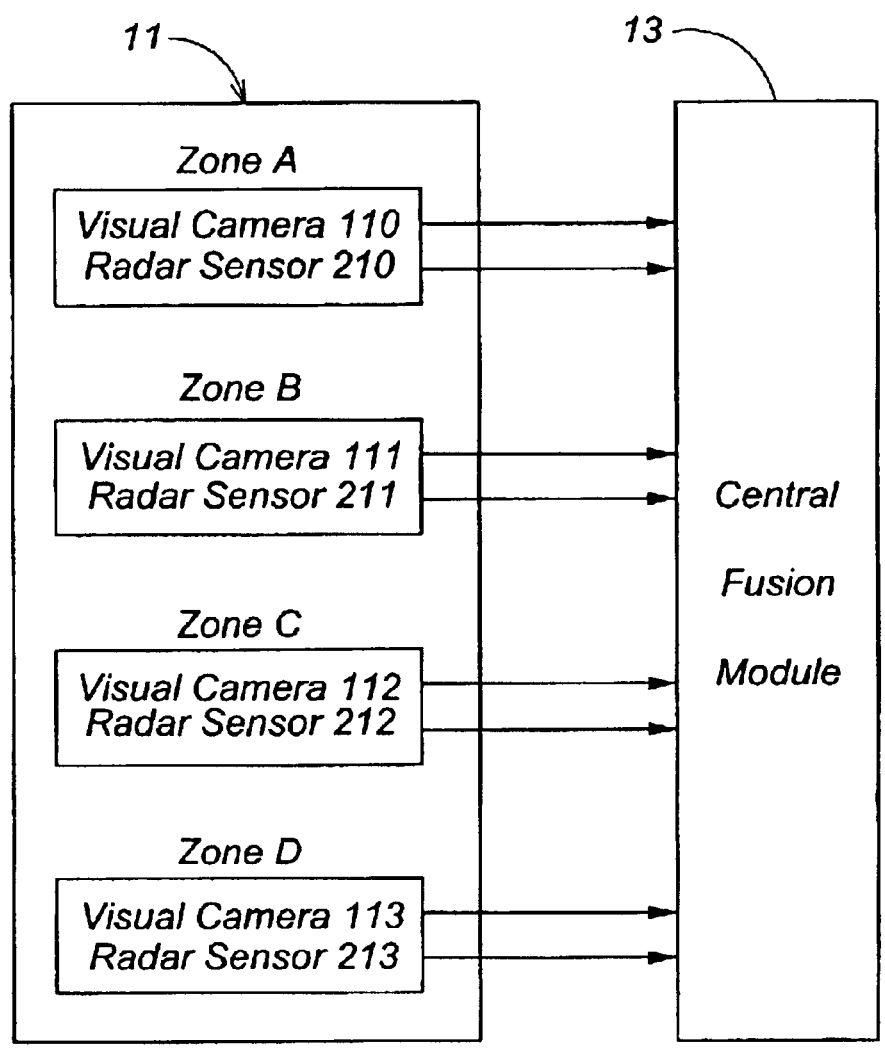
FIG. 3 is a block diagram showing a more detailed view of the input sensors shown in FIG. 2.

More specifically, referring to FIG. 3, input-detecting section 11 includes four visual cameras 110, 111, 112, and 113 and four radar sensors 210, 211, 212, and 213. There is an output from the combination of sensors in input detecting section 11 to central fusion module 13. The visual cameras give good angular information about adjacent objects. The radar sensors give good depth and distance information about adjacent objects.

Figure 4:
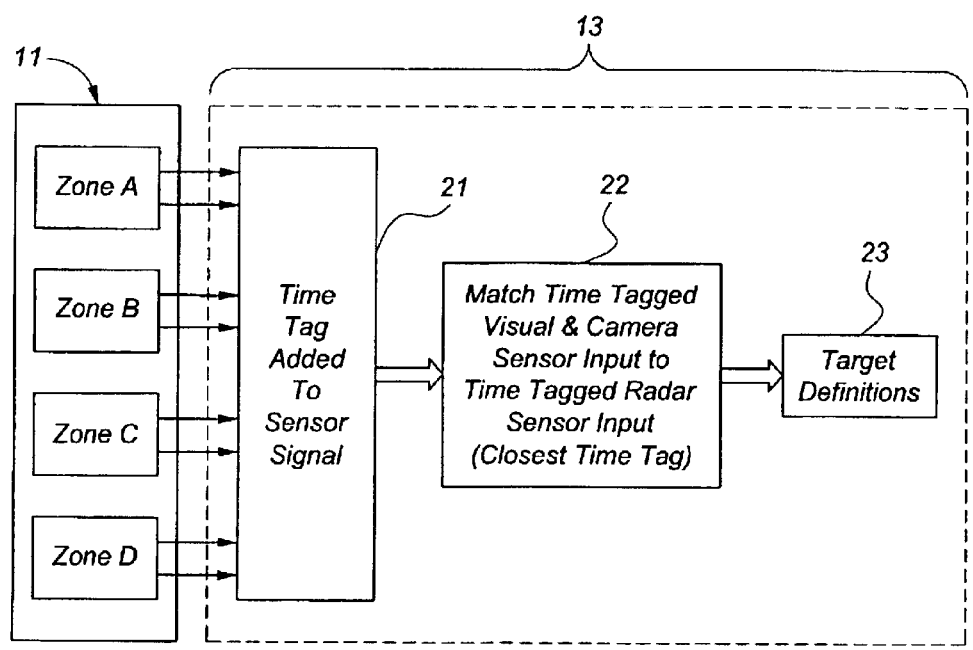
FIG. 4 is a block diagram of the function of the fusion control module as information from the sensors is processed to obtain target definition for multiple targets using matching of time tagged data.

Referring to FIG. 4, input-detecting section 11 provides inputs to central fusion module 13. Central fusion module 13 includes a tag block 21 coupled to receive an output from input-detecting section 11 for adding a time tag to the incoming sensor signal. Thus, each sensor signal is identified with respect to the time the sensor signal is received. Tag block 21 has an output coupled to the input of a matching block 22. Matching block 22 matches the time tagged visual and camera sensor inputs to a time tagged radar sensor input. Advantageously, this is done so that the closest time tags of each of the visual and radar inputs are matched. The output of matching block 22 is applied to a target definitions block 23.

Thus, referring to FIG. 4, a time tag indicating the time the data is generated is added to the input data received from the input sensors. Advantageously, some information from all the input sensors is used. A qualitative determination is made with respect to the value and accuracy of the information from each sensor. The best-input data is weighted more heavily than input data of lesser reliability. Thus, for each target a time tagged compilation of input data is used to characterize the target with respect to position, velocity, acceleration, size, and so on. This same procedure of using data from all sensors is applied to all targets in the surrounding environment. Further, for each target tracking data, the process is repeated as time goes on so that an updated target track is continually generated.

Figure 5:
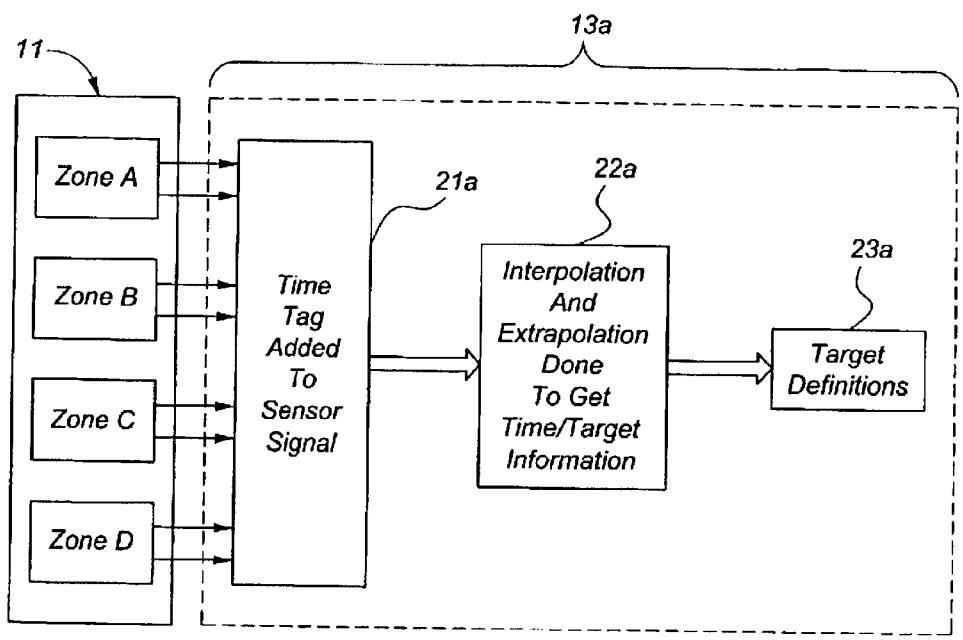
FIG. 5 is a block diagram of the function of the fusion control module as information from the sensors is processed to obtain target definition for multiple targets using extrapolation and interpolation of time tagged data.

Referring to FIG. 5, input-detecting section 11 provide inputs to central fusion module 13a. Central fusion module 13a receives an input at a tag block 21a. Tag block 21a has an output coupled to an interpolation/extrapolation block 22a. Interpolation/extrapolation block 22a processes information to get time/target information of increased accuracy at those points in time when actual time tagged sensor information indicates a slightly different time. To compensate for these slight differences in time the information from a sensor pair is interpolated and/or extrapolated to generate information characterizing the environment around the vehicle at substantially the same time. That is, after the data is time tagged it can be used to interpolate target information between time tags, and can be extrapolated to indicate projected target information after a time tag. The output of interpolation/extrapolation block 22a is coupled to target definitions block 23a.

In summary, a fusion process combining complementary data is used to characterize each target. The fusion process uses data from different sensors at the same point in time to get better definition of target objects surrounding the vehicle.

The information characterizing each target is then combined to generate a picture of the environment surrounding the vehicle. Such a picture would include all the targets, in all directions from the vehicle. Thus, the system provides a time tag with the data so it can be extrapolated to the same point in time for the fusion process to take place. The fused data can be stored in a target track file. Additional subsequent fused data can be compared to the current track files and if a match to a target is found the track file is updated. The current track files can be output for further processing.

Target-tracking information is obtained from all sensors of this embodiment. Each piece of information from a sensor relating to a particular target is given a time tag to identify it in the time domain. A plurality of such target tracking pieces of information is used through interpolation and extrapolation to obtain additional target tracking pieces of information. Such information from all sensors is fused together to get the best representation of the target position at a given time. This process is repeated for all targets around the 360-degree circumference of the vehicle. The totality of these targets is then combined to form a total picture of targets surrounding the vehicle.

While the present invention has been particularly shown and described with reference to preferred embodiment thereof, it will be understood by those skilled in the art that the foregoing and other changes in form and details may be made therein without departing from the spirit and scope of the present invention. For example, infrared sensors and laser sensors may be selected for use from the electromagnetic spectrum. Also, the time tagging function may occur at the sensor if the central fusion module has distributed processing ability.

What is claimed is:

1. A method for generating information characterizing the environment around a vehicle comprising the steps of:

Designating a plurality of information gathering zones around the vehicle;

Selecting a first sensor type from a first hand portion of the electromagnetic spectrum and selecting a second sensor type from a second bank of the electromagnetic spectrum;

Deploying at least one A sensor from the first sensor type and one B sensor from the second sensor type in each information gathering zone;

Time tagging information generated from the A and B sensors so as to indicate when the information characterizing the ambient was gathered;

Selecting information A (t1), characteristic of a time t1, from sensor A;

Selecting information B (t2), characteristic of a time t2, from sensor B which corresponds to substantially the same time as information A (t1); and Fusing information A (t1) and B (t2) so as to characterize a target in the environment of the vehicle.

2. A method for generating information as recited in claim 1 further comprising the steps of:

Selecting from the steps of interpolating and extrapolating the information of B (t2);

Interpolating the information of B (t2) to be at the same time tag moment as A (t1); and Extrapolating the information of B (t2) to be at the same time tag moment as A (t1).

3. A method for generating information characterizing the environment, including a target, around a motor vehicle including the steps of;

Designating four information gathering zones A,B C, and D around the vehicle;

Selecting a radar sensor type and selecting a camera sensor type;

Deploying one radar sensor and one camera sensor in each information-gathering zone A, B, C, and D;

Time tagging information generated from the radar and camera sensors so as to indicate when the information characterizing the target was gathered;

Selecting information A (t) from the radar sensor;

Selecting information B (t) from the camera sensor which corresponds in substantially the same time to information A (t); and Fusing information A (t) and B (t) so as to characterize the target in the environment of the vehicle.

4. A method for generating information as recited in claim 3 further comprising the steps of:

Selecting from the steps of interpolating and extrapolating the information of B (t);

Interpolating the information of B (t) to be at the same time tag moment as A (t); and Extrapolating the information of B (t) to be at the same time tag moment as A (t).

* * * * *